No. 792,930. PATENTED JUNE 20, 1905.
T. D. ROWAN.
COMBINED SPIRIT LEVEL AND GAGE.
APPLICATION FILED OCT. 20, 1904.
4 SHEETS—SHEET 1.
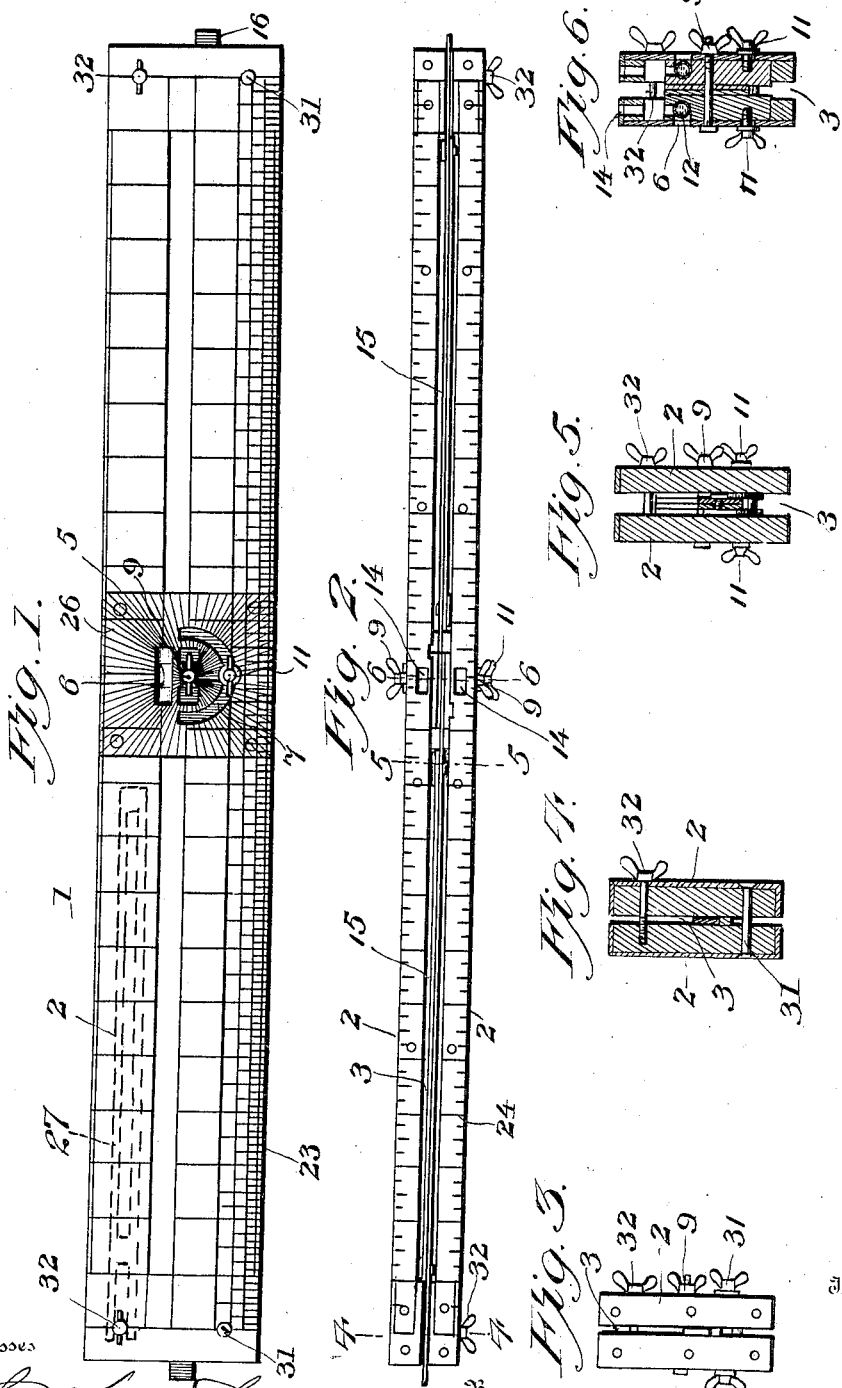

No. 792,930. PATENTED JUNE 20, 1905.
T. D. ROWAN.
COMBINED SPIRIT LEVEL AND GAGE.
APPLICATION FILED OCT. 20, 1904.
4 SHEETS—SHEET 2.
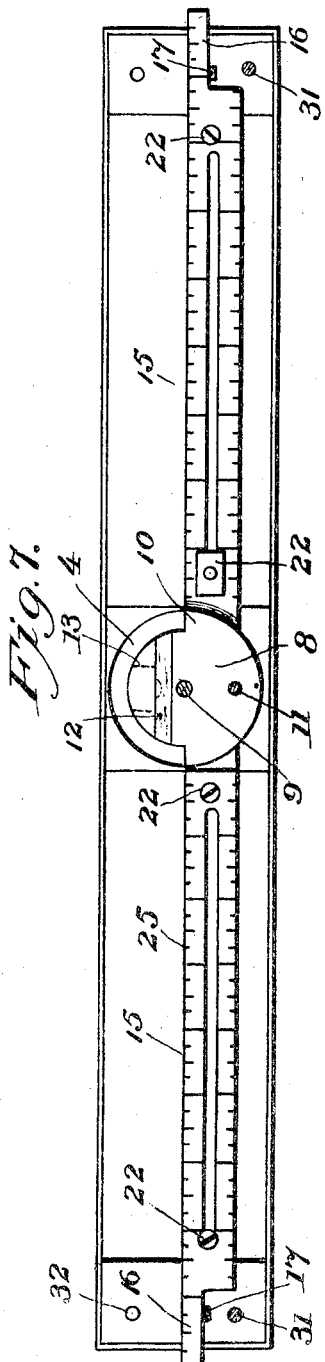
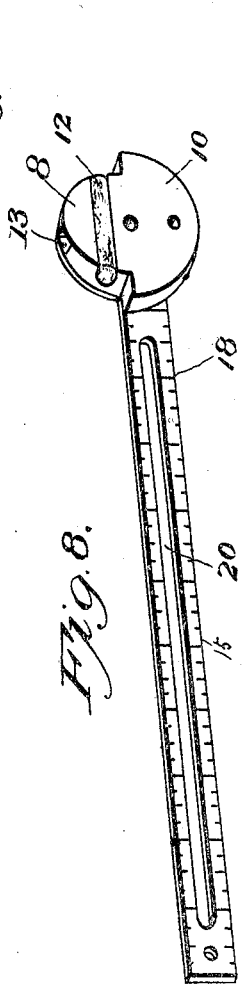
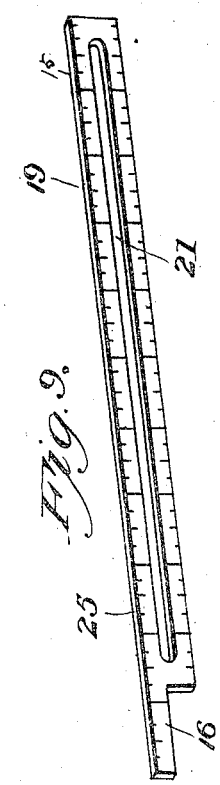
Witnesses
Inventor
Theodore D. Rowan
By Victor J. Evans
Attorney

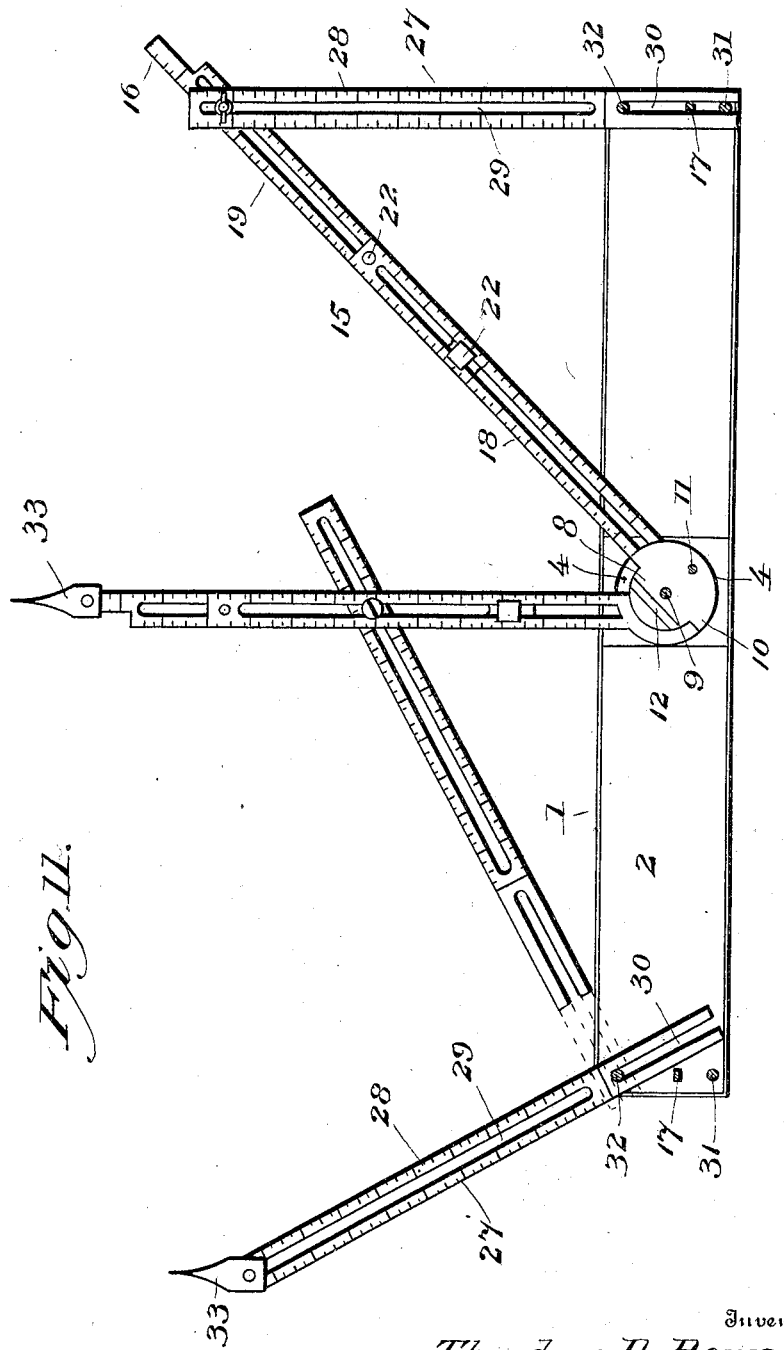

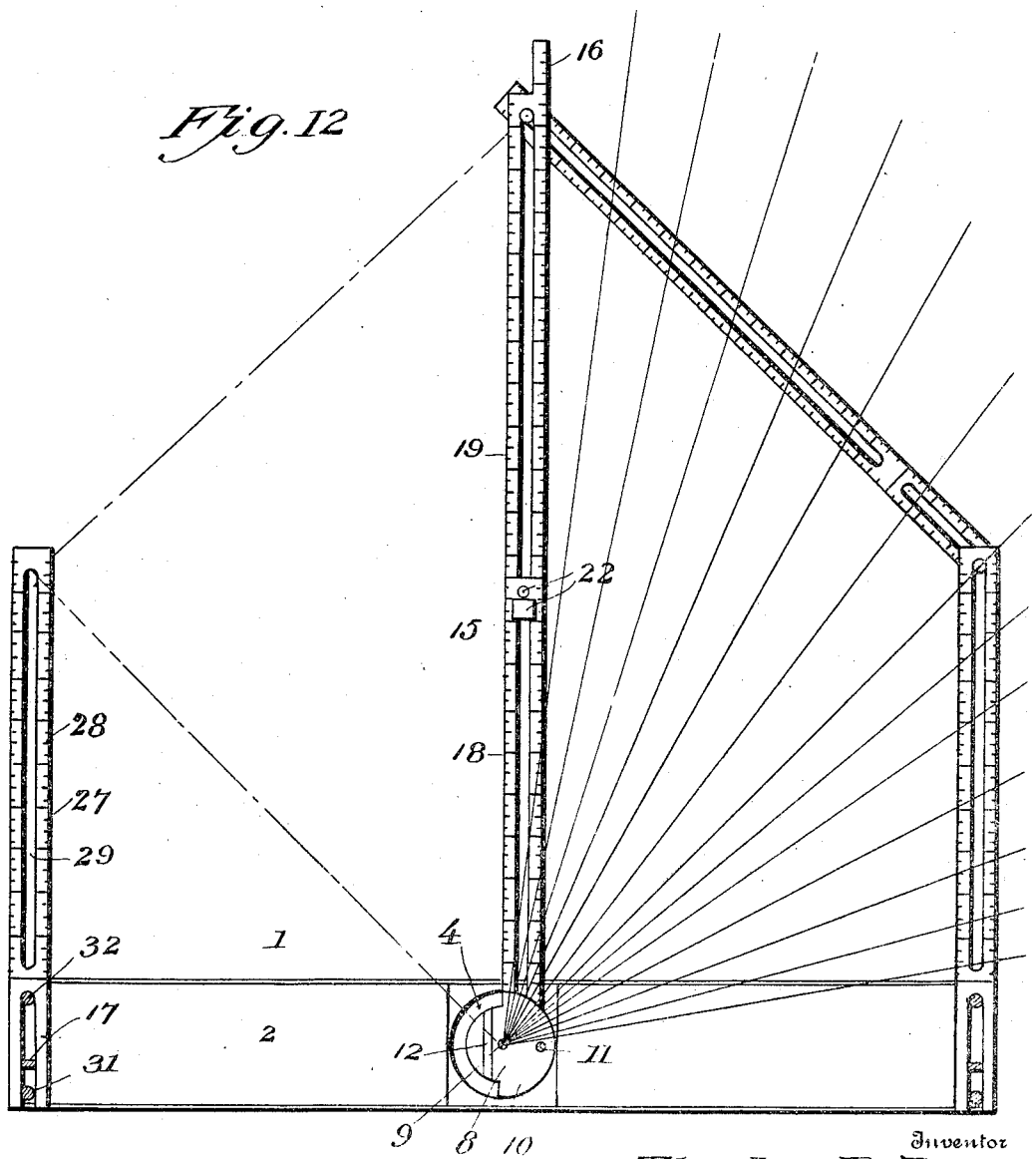

No. 792,930.

Patented June 20, 1905.

UNITED STATES PATENT OFFICE.

THEODORE DAVID ROWAN, OF COLUMBIA, SOUTH CAROLINA, ASSIGNOR OF ONE-HALF TO LEONIDAS BYRD DOZIER, OF COLUMBIA, SOUTH CAROLINA.

COMBINED SPIRIT-LEVEL AND GAGE.

SPECIFICATION forming part of Letters Patent No. 792,930, dated June 20, 1905.

Application filed October 20, 1904. Serial No. 229,299.

*To all whom it may concern:*

Be it known that I, THEODORE DAVID ROWAN, a citizen of the United States, residing at Columbia, in the county of Richland and State of South Carolina, have invented new and useful Improvements in a Combined Spirit-Level and Gage, of which the following is a specification.

This invention relates to a combined spirit-level and gage, and has for its objects to produce a simple inexpensive device of this character which in practice will efficiently perform the functions of a level, square, and angular gage for truing a wall or building and for determining the various and proper angles of the beams, joists, &c., employed in the construction of the latter and for determining the angles on which the ends of the beams and joist are to be cut.

A further object of the invention is to provide a device of this character by which the falling degree of a floor or surface may be readily and accurately determined and the spirit-tubes adjusted accordingly.

With these and other objects in view the invention comprises the novel features of construction and combination of parts more fully hereinafter described.

In the accompanying drawings, Figure 1 is a side elevation of a device embodying the invention. Fig. 2 is a top plan view of the same. Fig. 3 is an end elevation. Figs. 4, 5, and 6 are transverse sections taken, respectively, on the lines 4 4, 5 5, and 6 6 of Fig. 2. Fig. 7 is a side elevation, partly in section, of the level, showing one side of the casing removed. Fig. 8 is a perspective view of one of the rotary heads and the primary section of one of the adjustable arms attached thereto. Fig. 9 is a perspective view of the secondary section of one of the adjustable arms. Fig. 10 is a perspective view of one of the tram-points. Fig. 11 is a sectional elevation showing certain adjustments of the various arms or members carried by the level. Fig. 12 is a similar view showing another adjustment of said arms.

Referring to the drawings, 1 designates the spirit-level as a whole, which preferably comprises a pair of side members or plates 2, arranged in spaced parallel relation to produce a central longitudinal opening or slot 3, each of said plates 2 being provided at its longitudinal center and upon its inner face with a circular recess or seat 4 and having attached upon its outer face, at its longitudinal center, a plate 5, in which is formed a horizontal sight-opening 6 and a semicircular slot 7, arranged beneath the opening 6.

Disposed between the plates 2 and respectively in the recesses 4 is a pair of circular heads 8, journaled for rotation upon a common axle 9, preferably in the form of a set-screw, each of these heads having a semicircular parallel extension or enlargement 10, normally overlying the adjacent slot 7, which latter is concentric with the pivotal axis 9 and receives a set-screw or other clamping member 11, by which the head may be fixed against movement.

Each of the heads 8, which is provided with a transverse recess for the reception of a spirit-tube 12, has a sight-opening 13 adapted to normally register with a corresponding opening 14 in the normally upper edge of the level to permit of inspection of the spirit-bubble and carries an arm 15, provided at its outer end with a finger or extension 16, designed to engage a stop or abutment 17 at the end of and between the plates 2, whereby when the arms are in normal position between the plates and within the recess 3 the spirit-tubes will be in level position. Each arm 15 comprises a primary section 18 and a secondary section 19, having, respectively, longitudinal slots 20 and 21, which register for the reception of fastening devices or screws 22, carried by the sections for securing the latter together and permitting of their relative longitudinal adjustment or extension to vary the length of the arms.

The outer side face of each of the plates 2 is graduated, as at 23, to designate feet and inches, while the normally upper edges of the sections 2 are graduated at 24 to indicate degrees, similar degree graduations 25 being formed upon the arms 15, while upon the outer faces of the plates 6 and traversing the pivotal axis of the heads 8 are radiating degree-lines 26, disposed at angles respectively to intersect the degree graduations 24 upon the faces of the plates 2, it being understood that the graduations 24 and 25 are conventionally indicated herein. The device is also equipped with a pair of arms or heads 27, each graduated in inches, as at 28, and provided with a primary longitudinal slot 29 and a secondary outwardly-opening slot 30, which latter permits of said arms being seated over a pair of set-screws 31 32, arranged at the ends and in alinement transversely of the level 1 to thus adapt the device for use as a try-square. Furthermore, the device is provided with a pair of tram-points 33, which may be attached by set-screws 34 to the ends of the arms 15 or 27 for the purpose of describing circles.

In practice the arms 15 are normally housed within the recess 3 between the plates 2, and the arms 27 are temporarily attached to the outer face of one of the plates, as shown by dotted lines in Fig. 1, under which conditions the device may be employed for and perform the ordinary functions of a spirit-level. When, however, it is desired to use the device as a square, one of the arms 27 is detached from the level 1 and seated in position upon the retaining members 31 32, as indicated at the right-hand end of Fig. 11. If in the use of the device it becomes desirable to ascertain any degree upon the margin of a square or circle, one of the retaining members or set-screws 32 is removed and the adjacent arm 15 is turned upon its pivot 9 until its edge intersects the corresponding appropriate degree graduation upon one of the plates 2, whereupon the active edge of the arm 15 will aline with the corresponding line 26 on the plate, and a line drawn parallel with and in continuation of the said degree-line 26 to intersect the margin of the circle or square will give the desired degree upon the latter. Again, if it be desirable to ascertain the pitch of a roof and the corresponding angle of the rafters a pair of the arms 15 and 27 may be arranged as designated in Fig. 11, or for ascertaining the angle of a roof relative to the walls of the building the parts may be arranged as illustrated in Fig. 12.

From the foregoing it is apparent that I produce a simple device admirably adapted for ascertaining the appropriate level or plumb of the walls, floors, and roof of a building and for determining the relative angular degrees of the various parts and the true measurements of the latter and for various other purposes, which will be apparent to one skilled in building construction, and this without the use of other measuring instruments or gages. In attaining these ends it is to be understood that various minor changes in the details herein set forth may be resorted to without departing from the spirit of the invention.

Having thus fully described the invention, what is claimed as new is—

1. In a device of the class described, a body comprising a pair of spaced members producing a longitudinal recess, said members having upon their inner faces circular recesses, a pair of heads pivoted upon a common axle and disposed respectively in the circular recesses, spirit-tubes carried respectively by the heads, and a pair of arms normally disposed in the longitudinal recess and fixedly connected one to either of the heads.

2. In a device of the class described, an elongated body comprising a pair of spaced plates, a pair of retaining members disposed in spaced alinement transversely of the body, a graduated arm adapted for engagement with the retaining members to be maintained thereby at right angles to the body, an arm pivotally connected with the body at its longitudinal center, and a spirit-tube carried by the head.

In testimony whereof I affix my signature in presence of two witnesses.

THEODORE DAVID ROWAN.

Witnesses:
   E. O. De Pass,
   A. C. De Pass.